Nov. 23, 1926.  1,607,729
E. J. DOBERSTEIN
POWER SHOVEL
Filed April 30, 1926   6 Sheets-Sheet 1

Patented Nov. 23, 1926.

1,607,729

UNITED STATES PATENT OFFICE.

EDWARD J. DOBERSTEIN, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Application filed April 30, 1926. Serial No. 105,622.

This invention relates to power shovels for use in confined spaces such as in mines, although not limited to this use alone. Specifically, the invention relates to the longitudinally movable scoop carrying beam type of power shovel and has for its principal object the provision of a structure whereby the length required for the longitudinal operation of the scoop carrying beam is relatively short, all with a view toward general all around convenience and efficiency, particularly where used in confined spaces.

Referring to the drawings.

Like numerals refer to like parts throughout the several figures.

In the drawings 1 designates a base frame which is carried on continuous tread means 2 of usual construction which are adapted for the propulsion of the shovel.

Mounted centrally upon the base frame 1 is a vertically disposed cylinder 3 containing a piston 4, arranged so that the piston may be raised by fluid pressure to engage a fixed part, such as a roof, thus forming a holding jack for the machine while it is in operation.

Figure 1:
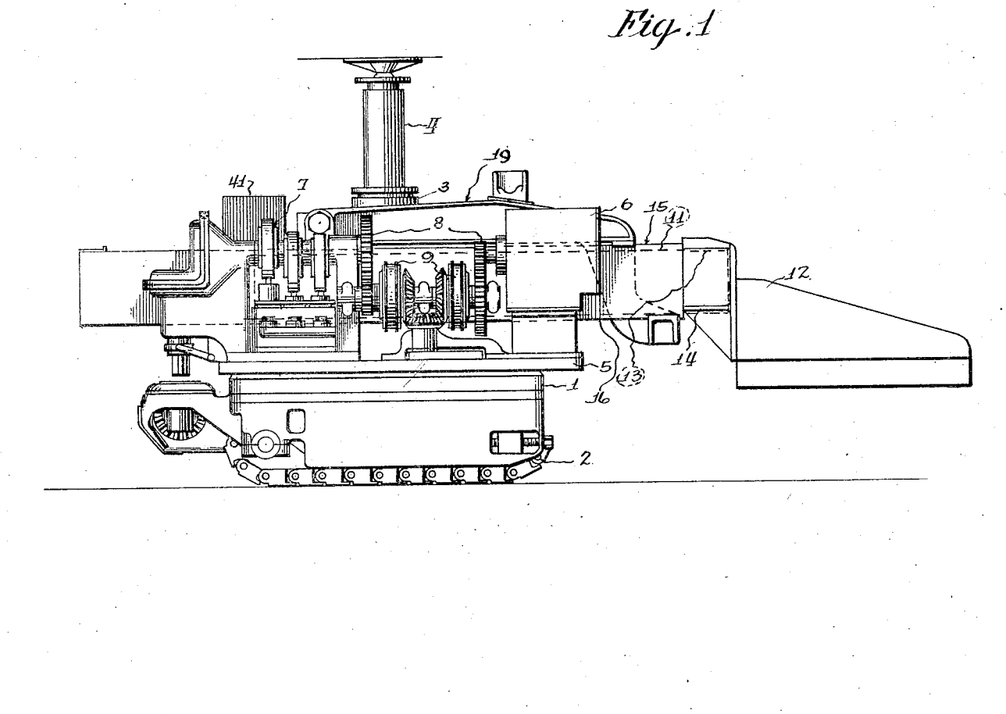
Figure 1 is a side elevation of a power shovel embodying one form of my invention.
Figure 2:
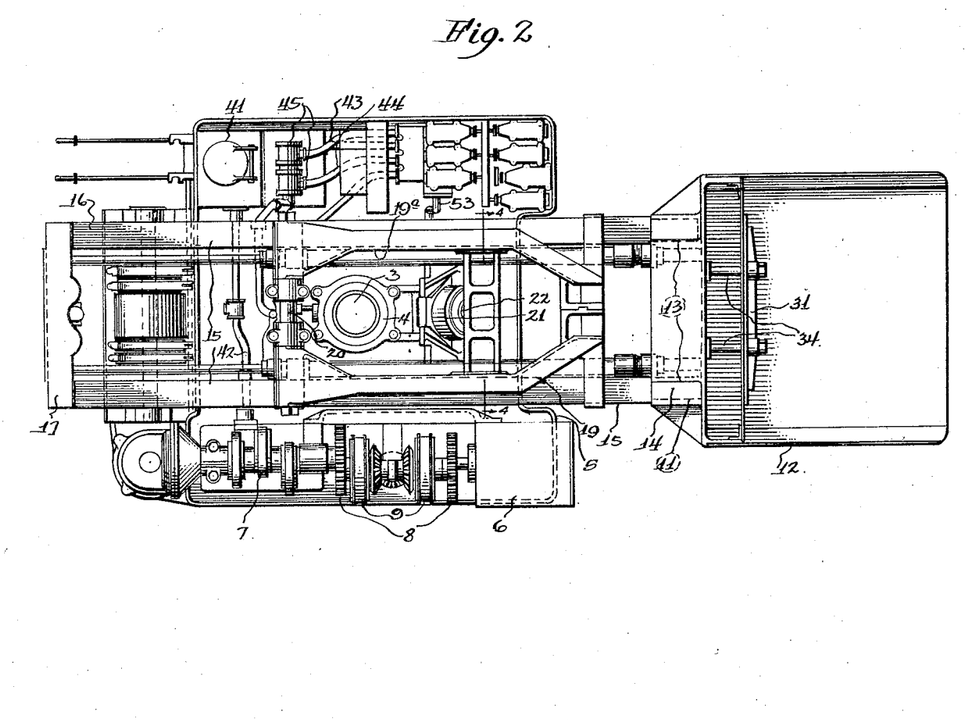
Figure 2 is a plan view, with parts omitted, of the machine illustrated in Figure 1.

A turntable or rotatable frame 5 is carried by the base 1 for movement axially about the vertically disposed cylinder 3, and this turntable carries the major portion of the operating mechanism. See Figures 1 and 2.

An electric motor 6 and a fluid pressure pump 7, driven thereby by a reduction gear transmission mechanism 8, are mounted on the turntable, and are disposed in horizontal longitudinal arrangement along one side thereof. The turntable is actuated about its axis in either direction by the motor 6 through manually controlled oppositely acting clutch devices 9 associated with the transmission mechanism 8.

A beam 11 carries a scoop 12 at its front end and comprises two laterally spaced inwardly facing parallel channel members 13 and a single cross tie structure 14 at the front ends of the channel members and forming the rear end of the scoop 12. A second beam 15, comprising two laterally spaced inwardly facing parallel channel members 16 and a cross tie structure 17 at the rear ends of these channel members, has the channel members 13 of the beam 11 telescopically engaged within respective of its channel members 16 for relative longitudinal movement by means of bearings 18 secured with the channel members 16 and slidably engaged with the channel members 13. The pairs of engaged channel members of the two beams 11 and 15 are disposed on opposite sides of the centrally disposed holding jack, and the channel members 16 of the beam 15 are mounted for longitudinal movement on an elevating arm 19. This elevating arm is journaled at its rear end for pivotal movement in a vertical plane on a horizontal shaft 20 disposed transversely of the beams 11 and 15 and carried by the turntable at an elevated point to the rear of the holding jack, thus providing for vertical movement of the scoop 12. See Figures 1 to 6, inclusive.

Actuating means for the elevating arm 19 consists of a cylinder 21, disposed forward of the holding jack and pivotally mounted on the turntable, and a piston 22 engaged in the cylinder and pivotally connected with the elevating arm. See Figures 1 and 4.

Radial movement of the scoop 12 by longitudinal movement of the beams 11 and 15 is effected in the following manner. Two revoluble sprockets 23 are mounted on the beam 15 adjacent the rear end thereof and are disposed on an axis transverse thereto within the enclosures of respective channel members 16 of this beam, and a pair of sprocket chains 24 are trained over respective of said sprockets. Both end portions of the chains extend forwardly from said sprockets and the ends thereof are secured respectively to the adjacent channel members 13 of the beam 11, as designated at 25, and to the elevating arm as designated at 26. See Figures 3, 4, 5 and 6. Thus forward movement of the beam 11 is transmitted to the beam 15 in a lesser magnitude and rearward movement of the beam 15 is transmitted to the beam 11 in a greater magnitude by the chains 24 cooperating with the sprockets 23.

Figures 3, 4:
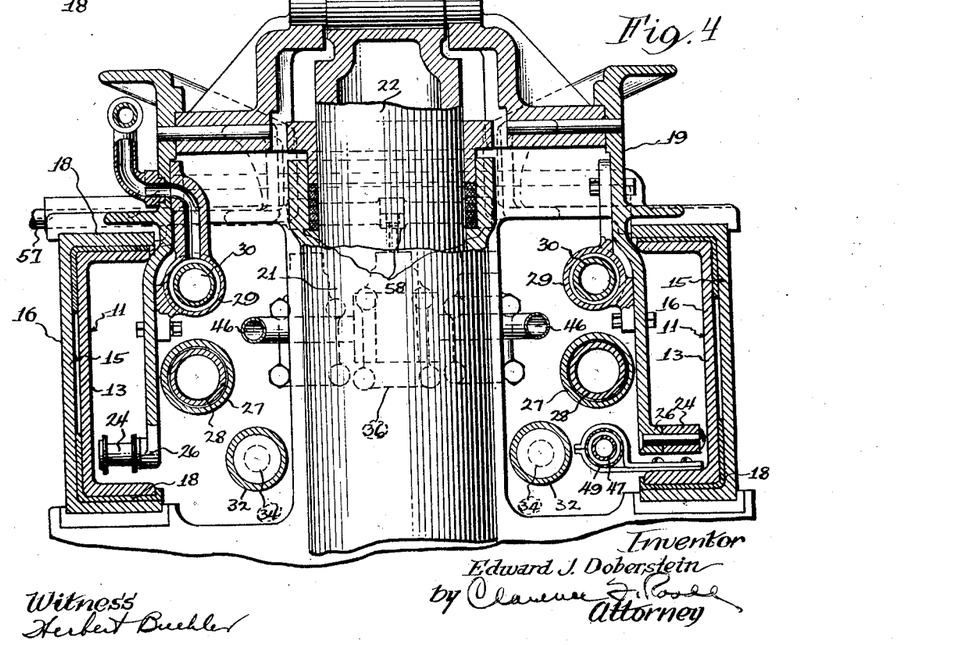
Figure 3 is an enlarged rear elevation of a portion of the machine with parts broken away and in section.
Figure 4 is an enlarged partial section on the line 4—4 of Figure 2.
Figure 5:
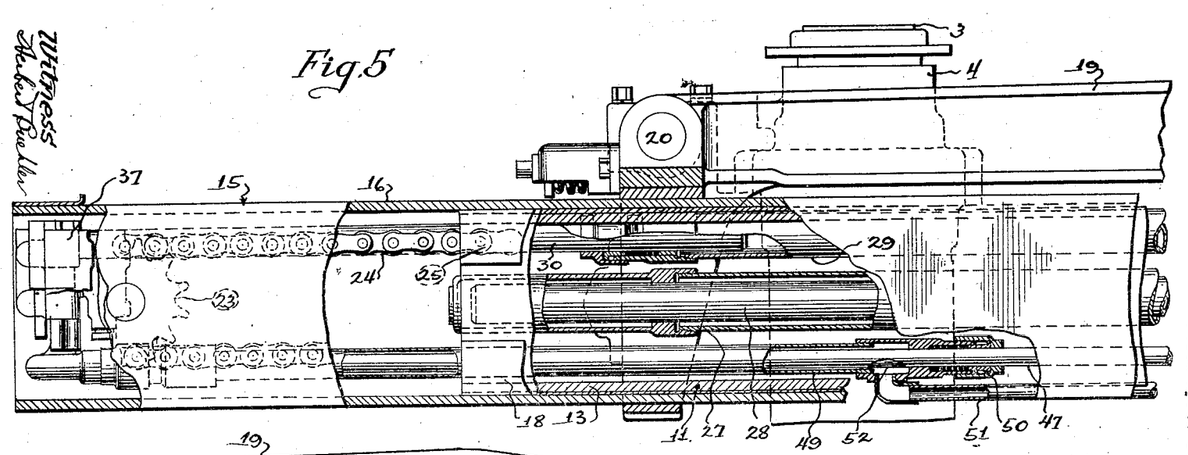
Figure 5 is an enlarged side elevation of a portion of the machine with parts broken away and in section.
Figure 6:
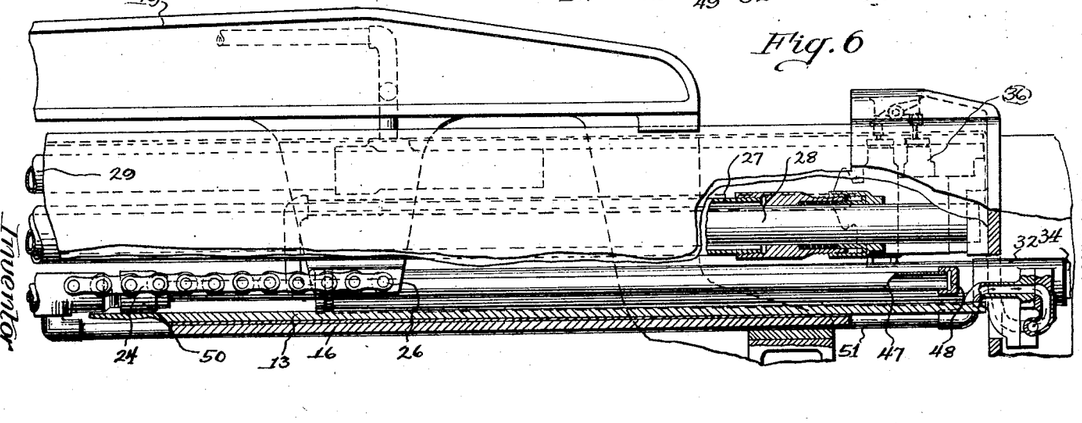
Figure 6 is an enlarged side elevation of another portion of the machine with parts broken away and in section.

Cooperating with the chains 24 and sprockets 23 to effect radial in and out movement of the scoop and longitudinal movement of the beam 15 in synchronism with and of lesser magnitude than corresponding longitudinal movement of the beam 11 are two oppositely acting pairs of radial cylinders arranged longitudinally of the beams. The lower pair of cylinders 27, hereinafter called the out cylinders, are secured with the elevating arm 19, as shown in Figure 3, and the plungers thereof are secured with the forward end of the beam 11, as shown in Figure 6, to thrust the beam 11 forwardly. The upper pair of cylinders 29, hereinafter called the in cylinders, are secured with the elevating arm 19, as shown in Figure 4, and the plungers 30 thereof are secured with the rear end of the beam 15, as shown in Figure 5, to thrust the beam 15 rearwardly. Thus as the beam 11 is moved forwardly by the out cylinders 27, the beam 15 is moved forwardly at one half the rate of movement of the beam 11 by means of the chains 24 and sprockets 23, and as the beam 15 is moved rearwardly by the in cylinders 29 the beam 11 is moved rearwardly at twice the rate of movement of the beam 15 by means of the chains 24 and sprockets 23, whereby both in and out radial movement of the scoop 12 is effected.

By reason of the supporting element, exemplified by the beam 15, with respect to which the beam 11 is longitudinally movable, being movable in a direction corresponding with longitudinal movement of the beam, the necessary length of the beam 11 is relatively short as compared to the stroke and engagement length thereof, thereby resulting in a correspondingly short length required for longitudinal operation of this beam.

The spacing of the channel members 13 of the beam 11 with the single cross tie structure 14 at the front end of this beam provides a central vertical opening through this beam at the rear end thereof and extending forwardly therefrom. This opening aligns with the vertical holding jack, hereinbefore described, and provides clearance therefor in the movement of this beam in which the rear end thereof passes forwardly and rearwardly of the jack. The spacing of the channel members 16 of the beam 15 with the cross tie structure 17 at the rear end of this beam provides a central vertical opening extending longitudinal thereof to provide clearance for the holding jack in the movement of this beam, and the elevating arm 19 is provided with a vertical opening 19ª therethrough providing clearance for the jack. Thus, the beam 11 while being radially disposed with respect to the jack has its stroke advantageously disposed with respect to the turntable and the jack. Correspondingly, the stroke of the beam 15 and the disposition of the arm 19 are advantageously related with the jack, turntable and beam 11, all with a view toward minimizing the projection of the scoop carrying mechanism at the rear of the turntable when the scoop is at inner positions thereof, maintaining adequate engagement lengths between the scoop carrying parts, and effecting adequate stroke of the scoop properly related with the turntable.

The hydraulic cylinders 27 and 29 in cooperation with the chains 24 and sprockets 23 provide a simple and effective means for actuating the scoop carrying beam 11 and synchronizing the movements of the beams 11 and 15. In addition the construction is well adapted for use on a shovel, having, as shown, a centrally disposed holding jack.

The scoop 12 is provided with an ejector plate 31 movable longitudinally thereof for ejecting material from the scoop, and actuation of the ejector plate is effected hydraulically in the following manner. Two double acting cylinders 32 are secured with the scoop at the front end of the beam 11, and the plungers 33 of these cylinders are connected through plunger rods 34 with the ejector plate 31 for moving the ejector plate longitudinally of the scoop outwardly to eject material from the scoop and for retracting the ejector plate to the inner end of the scoop. See Figures 2 and 10.

Figure 10:
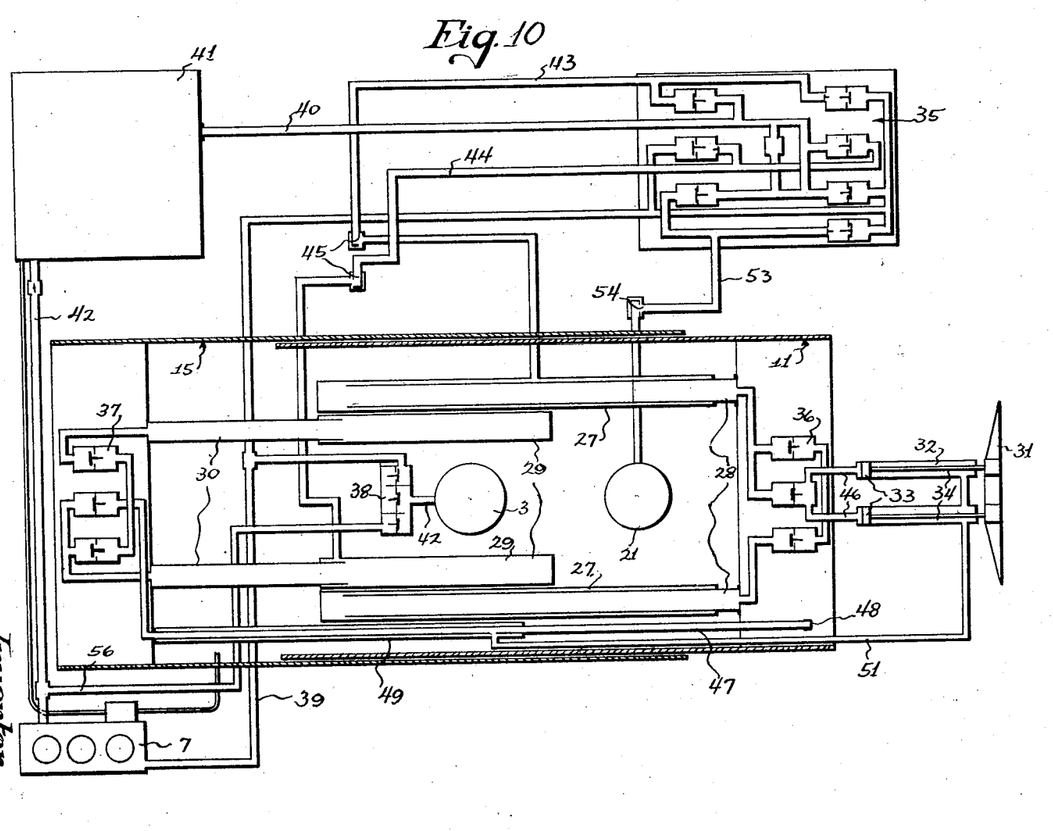
Figure 10 is a diagrammatic view of the fluid pressure system of the machine and related parts.

The hydraulic system for controlling the various movements of the hydraulically operated parts will now be described briefly. The pump 7, driven by the motor 6, serves to effect the pressure in the system. The connections from this pump to the various actuating parts of the system are effected through valve means, which as shown, consist of platform valves generally indicated at 35, front and rear beam valves indicated at 36 and 37 respectively, and jack valves generally indicated at 38. The platform valves 35 are mounted on the turntable forwardly and on the side of the beam structure opposite that on which the pump 7 and motor 6 are disposed. See Figure 2. The front beam valves 36 are mounted on the beam 11 at the front end thereof, see Figures 4 and 6, and the rear beam valves 37 are mounted on the beam 15 at the rear end thereof, see Figures 3 and 5. The jack valves 38, see Figure 10, are mounted on the turntable in suitable association with the jack cylinder 3.

The platform valves 35 are manually controlled in a manner unnecessary to be described, and are employed to apply fluid pressure, effected by the pump 7, to and to release fluid pressure from the lifting cylinder 21 to operate the elevating arm 10, and in cooperation with the beam valves 36 and 37, which are also manually controlled, to selectively apply the fluid pressure from the pump 7 and to release fluid pressure from the out cylinders 27, the in cylinders 29 and the ejector cylinders 32 for actuation of the beams 11 and 15 and the ejector plate 31.

To effect this the following connections are employed. See particularly Figure 10. A high pressure pipe 39 leads from the outlet of the pump 7 to the platform valves 35, and a return pipe 40 leads from the platform valves to a tank 41, mounted on the turntable 5 rearwardly on the same side of the beams 11 and 15 as the platform valves 35 are disposed, the pump 7 drawing fluid from the tank through a pipe 42. A pair of pipes 43 and 44, each of which includes a swivel joint 45 disposed coaxially with the elevating arm 19 to provide for movement of the arm, lead from the platform valves and connect respectively with an out cylinder 27 and an in cylinder 29. The out cylinders 27 are connected in series by means of the front beam valves 36 which are connected with the hollow plungers 28 of these cylinders, and the in cylinders 29 are connected in series by means of the rear beam valves 37 which are connected with the hollow plungers 30 of these cylinders. The out and in cylinders which are connected with the pipes 43 and 44 are respectively connected with the rear end front ends of the ejector cylinders 32 respectively, through the beam valves 36 and 37, pipes 46 leading from the front beam valves 36 to the rear ends of the ejector cylinders 32 and a conduit leading from the rear beam valves 37 to the front ends of the ejector cylinders 32. This last mentioned conduit comprises as follows: A pipe 47 leads from the rear beam valves 37 forwardly therefrom in parallelism with the beams 11 and 15 and has its front end closed by a cap 48. See Figure 6. Another pipe 49 surrounds the aforementioned forwardly extending portion of the pipe 47 and is provided at the ends thereof with bearing and packing structures 50 which engage the pipe 47 for sliding movement to permit movement of the pipe 49 along the pipe 47. See Figures 5, 6 and 10. A pipe 51 leads from the pipe 49 and communicates with the front ends of the ejector cylinders 32. The pipe 47 is secured with the rear beam 15, and the pipe 49 moves along the pipe 47 with relative movement of the beams, thus providing for movement of the beams. The pipe 47 is provided with an aperture 52 which is so disposed that it lies between the bearing and packing structures 50 in all relative positions of the beams 11 and 15 by means of the aperture 52 and the space between the pipe 49 and the pipe 47. Thus is provided a slip joint permitting relative movement of the beams 11 and 15, and it will be observed that this slip joint is balanced so that fluid pressure therein has no tendency to effect movement of the beams.

The beam valves 36 and 37 are controlled together by means hereinafter described, and in one position thereof connect the out cylinders in series and the in cylinders in series. In this position of the beam valves the out and in cylinders are arranged for effecting longitudinal movement of the beams 11 and 15 and the beams are actuated by manipulation of the platform valves 35 as follows: To effect outward radial movement of the beams the platform valves are manipulated to introduce fluid pressure from the pump 7 into the out cylinders 27 through the pipe 43 and to release fluid pressure from the in cylinders 29 into the return pipe 40 through the pipe 44. To effect inward radial movement of the beams the platform valves are manipulated to introduce fluid pressure from the pump 7 into the in cylinders 29 through the pipe 44 and to release fluid pressure from the out cylinders 27 into the return pipe 40 through the pipe 43.

When the beam valves are in their other position the second in and out cylinders are sealed to lock the beams against longitudinal movement, and the first out cylinder 27 is connected with the rear ends of the ejector cylinders 32 and the first in cylinder 29 is connected with the front ends of the ejector cylinder whereby the ejector plate 31 is reciprocated by manipulation of the platform valves 35 in the same manner as they are manipulated for the reciprocation of the beams 11 and 15.

Fluid pressure from the pump 7 is introduced into and released from the lifting cylinder 21 for vertical actuation of the elevating arm 19 by manipulation of the platform valves 35, a pipe 53, including a swivel joint 54 disposed on the pivotal axis of the lifting cylinder to provide for pivotal movement of this cylinder, connecting the platform valves with this cylinder.

The jack valves 38 are connected with the high pressure pipe 39 by a pipe 55 and with the pipe 42 by a pipe 56 respectively, for introducing fluid pressure into the jack cylinder 3 and releasing the same therefrom.

Figure 7:
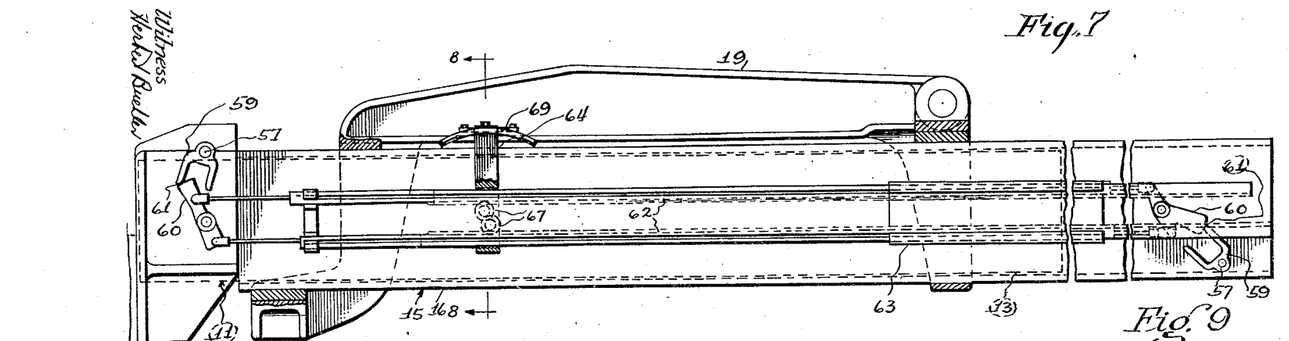
Figure 7 is a longitudinally condensed side elevation of the same portions of the machine shown in Figures 5 and 6 with parts broken away and removed and illustrating the opposite side of the same.

The mechanism for controlling the beam valves will now be described. Two horizontal shafts 57, transverse to the beams 11 and 15, are carried for pivotal movement respectively at the front end of the beam 11 and at the rear end of the beam 15, and these shafts are provided with arms 58 for operation of respective of the beam valves 36 and 37. See Figures 3 and 4. Bifurcated levers 59 are disposed on the sides of the beams 11 and 15 adjacent the platform valves 35 and are secured on respective shafts 57. See Figure 7. Levers 60 are pivotally mounted on respective beams at said sides thereof and adjacent respective levers 59 on axes parallel with the shafts 57. These levers 60 are provided with sector portions 61 engaging respective bifurcated levers 59 for oppositely actuating and locking the same by engaging between the divided portions of respective levers 59 for actuating the same and endwise engaging said divided portions to lock the levers 59 at opposite ends of their movements as shown in Figure 7. The beam valves 36 and 37 are oppositely positioned, as hereinbefore described, at respective opposite locked positions of the respective bifurcated levers 59.

The levers 60 are controlled in the following manner. See Figures 7, 8 and 9. Two pairs of vertically spaced opposing racks 62 extend longitudinally of the beams 11 and 15 at the vertical sides thereof on which the levers 60 lie and are carried with the beams by means of suitable bearings 63 on the rear beam 15. The racks of one pair of opposing racks are pivotally connected to the lever 60 of the front beam 11 at diametrically opposite points and the racks of the other pair are pivotally connected to the lever 60 of the rear beam 15 at diametrically opposite points for actuating these levers. Mounted on the elevating arm 19 intermediate the travel of the beams is a bracket 64 which overlies the racks. Pivotally mounted on the bracket 64 on a horizontal axis transverse to the beams is a member 65 to which is secured an upwardly extending lever 66. Two pairs of meshed revoluble spur gears 67 are mounted on the member 65 with their axes parallel with and disposed on opposite sides of the axis of this member and mesh with respective of respective pairs of opposing racks 62. A manually releasable latch device 68 of usual construction is mounted on the lever 66 and engages notches in a sector 69 on the bracket 64 to maintain the lever at opposite ends of its movement.

Figure 8:
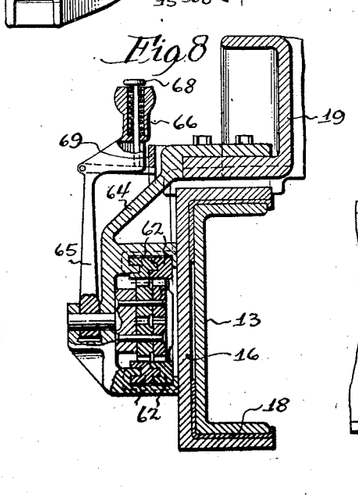
Figure 8 is an enlarged partial section on the line 8—8 of Figure 7.
Figure 9:
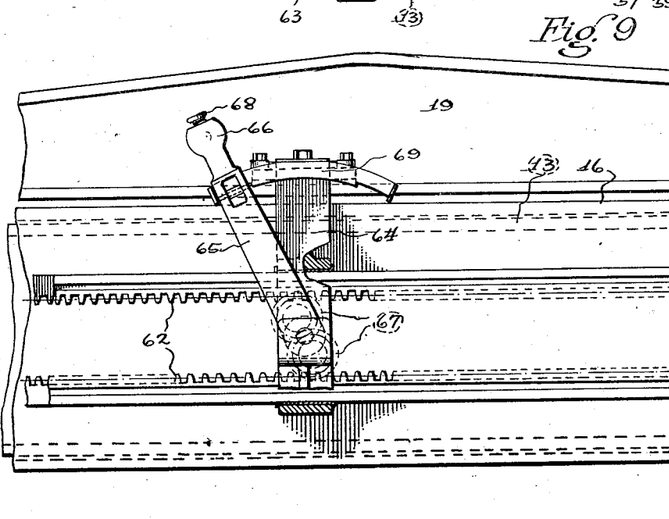
Figure 9 is a side elevation of the mechanism illustrated in Figure 8.

It will be observed that the meshed gears 67 have a differential relation with respective pairs of opposing racks 62 so that during longitudinal movement of the beams 11 and 15 the pairs of opposing racks move with respective beams in unchanged relation, this relation being maintained by the gears. However, when the lever 66 is moved the gears 67 move with it and effect relative movement of the respective pairs of opposing racks to actuate the levers 60 for operation of the beam valves 36 and 37 as hereinbefore described. Thus it will be observed that both of the beam valves 36 and 37 are controlled from the turntable by a single lever, the movements of both beams being compensated without involving sliding engagements of great length.

While I have herein shown and described one form of my invention, I do not wish to be limited to the precise details of construction or arrangements of parts herein shown and described except as specifically limited in the appended claims.

I claim as my invention:

1. In a power shovel, the combination with a vertical holding jack and a frame angularly movable thereabout, of a scoop beam provided with a vertical opening therethrough extending longitudinally thereof to and open at the rear end of the beam, means carrying said beam on said frame for a longitudinal movement with said opening aligned with said jack for clearance thereof and in which the rear end of the beam passes forwardly and rearwardly of said jack, said means including a support member with respect to which said beam is longitudinally movable and movable with respect to said frame in a similar direction, and means for effecting movement of said supporting element with a greater corresponding longitudinal movement of said beam.

2. In a power shovel, the combination with a vertical holding jack and a turntable frame angularly movable thereabout, of a scoop beam comprising two relatively short laterally spaced parallel longitudinal members and a single cross tie means disposed at the front end of the beam, means carrying said beam on said frame for vertical pivotal movement and for longitudinal movement with said longitudinal members operating in paths on respective sides of said jack and in which the rear end of the beam passes forwardly and rearwardly of the jack, said means including a supporting element upon which said longitudinal members are mounted for longitudinal movement and movable with respect to said frame in a corresponding direction, and provided with a vertical opening therethrough extending longitudinally thereof for clearance of said jack, and means for effecting said movement of said supporting element in synchronism with and of lesser magnitude than corresponding longitudinal movement of said beam.

3. In a power shovel, the combination of a vertical holding jack and a turntable frame angularly movable thereabout, of a relatively short beam having a central vertical opening at its rear end and extending forwardly, a scoop on the front end of said beam, a supporting element carrying said beam for longitudinal movement and provided with a central vertical opening therethrough extending longitudinally of the beam, an elevating arm pivotally mounted on said frame on a rearwardly disposed horizontal axis transverse to said beam and extending forwardly from said axis and carrying said supporting element for movement with respect thereto longitudinally of said beam, said elevating arm being provided with a central vertical opening therethrough and said supporting element, said elevating arm and said beam being disposed with the said openings thereof providing clearance for said jack, and means for effecting movement of said supporting element longitudinally of said beam in synchronism with and of lesser magnitude than corresponding longitudinal movement of said beam.

4. In a power shovel, the combination with a vertical holding jack and a turntable frame angularly movable thereabout, of a scoop beam comprising a pair of laterally facing laterally spaced and oppositely arranged parallel channel members and a single cross tie structure disposed at the front ends thereof, a second beam comprising a second pair of channel members arranged in correspondence with said first mentioned channel members and telescopically engaged with respective thereof for relative longitudinal movement and cross tie means at the rear ends of said second channel members, elevating means on said frame and carrying said second pair of channel members for longitudinal movement with respect thereto and with said jack disposed in the opening provided by said pairs of channel members and itself provided with an opening through which the jack extends, and means for effecting movement of said second beam with a greater corresponding movement of said scoop beam.

5. In a power shovel, the combination with a frame, of a beam, a scoop on one end of said beam, a supporting element with respect to which said beam is longitudinally movable and movable with respect to said frame in a corresponding direction for carrying the beam on said frame, actuating means for alternately actuating said beam and supporting element in respective of opposite directions, of said movement thereof, and increasing movement means for transmitting movement from said beam to said supporting element and vice versa in respective directions of actuation thereof by said actuating means and adapted to effect movement of said beam in a greater magnitude than movement of said supporting member.

6. In a power shovel, the combination with a frame, of a beam, a scoop on one end of said beam, a supporting element carrying said beam for longitudinal movement with respect thereto and movable with respect to said frame in a direction corresponding with said movement of said beam for carrying the beam on said frame, actuating means for alternately actuating said beam and supporting element in respective of opposite directions of said movement thereof, a flexible tension member having its ends secured respectively with said frame and beam, and a bight forming member mounted on said supporting element and over which said flexible member is trained for transmitting movement from said beam to said supporting element and vice versa in respective directions of actuation thereof by said actuating means.

7. In a power shovel, the combination with a turntable angularly movable in a horizontal plane, of a beam, a scoop on the front of said beam, means whereby said beam is carried on said turntable for longitudinal movement and movement in a vertical plane including a supporting element with respect to which said beam is longitudinally movable and movable with respect to said turntable in a direction corresponding with longitudinal movement of said beam, a fluid pressure device for actuating said beam forwardly, a second fluid pressure device for actuating said supporting element rearwardly, a revoluble bight forming element mounted on said supporting element, and a flexible tension member trained over said bight forming element with both end portions thereof extending forwardly therefrom having the ends thereof secured respectively with said beam and stationary with respect to longitudinal movement of said beam and corresponding movement of said supporting element.

8. In a power shovel, the combination with a turntable angularly movable in a horizontal plane, of a scoop beam comprising two laterally spaced inwardly facing parallel channel members and a single cross tie structure connecting the front ends thereof, a second beam comprising a second pair of laterally spaced inwardly facing parallel channel members on the outside of and telescopically engaged with said first mentioned channel members for relative longitudinal movement and a second cross tie structure connecting the rear ends of said second pair of channel members, an elevating arm pivotally mounted for movement in a vertical plane on an axis disposed transversely of said beams and carrying said second pair of channel members for longitudinal movement with respect thereto, two revoluble bight forming members mounted on said second mentioned beam adjacent the rear end thereof and disposed on an axis transverse thereto within the enclosures of respective channel members thereof, two flexible tension members trained over respective bight forming members and extending forwardly therefrom with both end portions and having the ends thereof secured respectively to the adjacent channel members of said first mentioned beam and to said elevating arm, and fluid pressure means arranged longitudinally of said beams and reacting on said elevating arm and acting directly on said first mentioned beam to actuate the same forwardly and acting directly on said second beam to actuate the same rearwardly.

9. In a power shovel, the combination with a frame, of a scoop beam comprising two laterally facing laterally spaced and oppositely arranged parallel channel members and a cross tie at the front ends of said channel members, and a second beam comprising a second pair of channel members arranged in correspondence with said first mentioned channel members and telescopically engaged with respective thereof for relative longitudinal movement and a second cross tie structure at the rear ends of said second pair of channel members, said second pair of channel members being mounted for longitudinal movement on said frame.

10. In a power shovel, the combination with a turntable angularly movable in a horizontal plane, a scoop beam comprising two laterally spaced inwardly facing parallel channel members and a single cross tie structure at the front ends thereof, a second beam comprising a second pair of laterally spaced inwardly facing parallel channel members telescopically engaged with said first mentioned channel members for relative longitudinal movement and a cross tie structure connecting the rear ends of said second pair of channel members, and an elevating arm carrying said second pair of channel members for longitudinal movement with respect thereto and pivotally mounted on said turntable on a horizontal axis disposed transversely of said beams.

11. In a power shovel, the combination of a longitudinally movable beam, a second similarly disposed beam carried by said first mentioned beam for longitudinal movement with respect thereto, control members carried by respective beams, an actuating member mounted independently of said beams, and differential mechanism operating longitudinally of said beams and adapted for response to adjustment of said actuating member for corresponding adjustment of said control members and compensating longitudinal movement of both of said beams.

12. In a power shovel, the combination of a longitudinally movable beam, a second similarly disposed beam carried by said first mentioned beam for longitudinal movement with respect thereto, control members carried by respective beams, a pivoted actuating member mounted independently of said beams on an axis transverse thereto, longitudinally movable racks extending longitudinally of said beams and operatively connected with respective control members for actuating the same with longitudinal movement of the racks with respect to respective beams, and differential gear means carried by said actuating member and meshed with said racks for longitudinal movement of the racks with respective beams and for response to angular movement of said actuating member for effecting longitudinal movement of the racks with respect to respective beams.

13. In a power shovel, the combination of a longitudinally movable beam, a second similarly disposed beam carried by said first mentioned beam for longitudinal movement with respect thereto, control members pivotally mounted on respective beams on parallel axes transverse thereto, a pivoted actuating member mounted independently of said beams on an axis parallel with the axes of said control members, two pairs of spaced opposing racks extending longitudinally of said beams, each pair being pivotally connected to a respective control member at diametrically opposite points, and two pairs of meshed revoluble spur gears carried by said actuating member and having their axes parallel with and disposed on opposite sides of the axis of said actuating member and meshing with respective of respective pairs of opposing racks.

Signed at Chicago, in the county of Cook and State of Illinois, this 28th day of April, A. D. 1926.

EDWARD J. DOBERSTEIN.